United States Patent [19]
Barber, Jr. et al.

[11] 4,123,883
[45] Nov. 7, 1978

[54] SOLAR ENERGY COLLECTOR

[75] Inventors: Everett M. Barber, Jr., Guilford; Thomas P. Hopper, Durham, both of Conn.

[73] Assignee: Sunworks, Inc., Guilford, Conn.

[21] Appl. No.: 772,971

[22] Filed: Feb. 28, 1977

[51] Int. Cl.² ............................................. E04B 7/18
[52] U.S. Cl. ............................ 52/200; 52/475; 237/1 A; 126/270
[58] Field of Search ............. 52/475, 476, 397, 506, 52/509, 199, 200, 400, 461, 463, 464; 237/1 A; 126/270, 271

[56] References Cited
U.S. PATENT DOCUMENTS

| 2,425,060 | 8/1947 | Gildhaus | 52/200 |
|---|---|---|---|
| 3,440,779 | 4/1969 | Helma | 52/200 X |
| 3,844,087 | 10/1974 | Schultz et al. | 52/476 X |
| 3,937,208 | 2/1976 | Katz et al. | 237/1 A X |
| 3,972,317 | 8/1976 | Gallagher | 237/1 A X |
| 3,980,071 | 9/1976 | Barber, Jr. | 237/1 A |
| 3,995,804 | 12/1976 | Folds et al. | 237/1 A X |
| 4,052,000 | 10/1977 | Honikman | 237/1 A |

Primary Examiner—Price C. Faw, Jr.
Assistant Examiner—Carl D. Friedman
Attorney, Agent, or Firm—DeLio and Montgomery

[57] ABSTRACT

A housing for a solar energy collector which is formed of one-piece wall sections having integral flashing reglets and so formed as to provide lifting surfaces for the housings, help define an alignment and securing channel on the housing, aid in positioning a transparent cover retaining cap on the walls, and provide a weatherproof housing.

25 Claims, 7 Drawing Figures

U.S. Patent  Nov. 7, 1978  Sheet 1 of 2  4,123,883
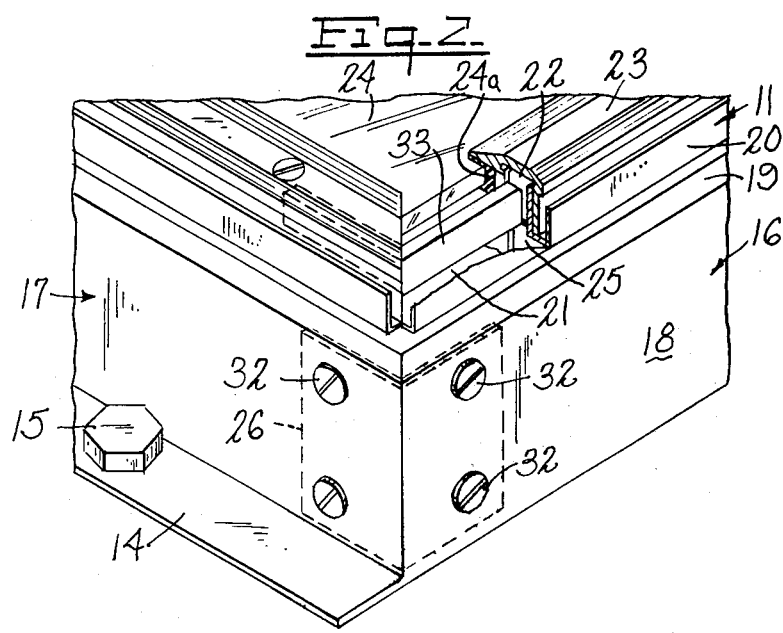

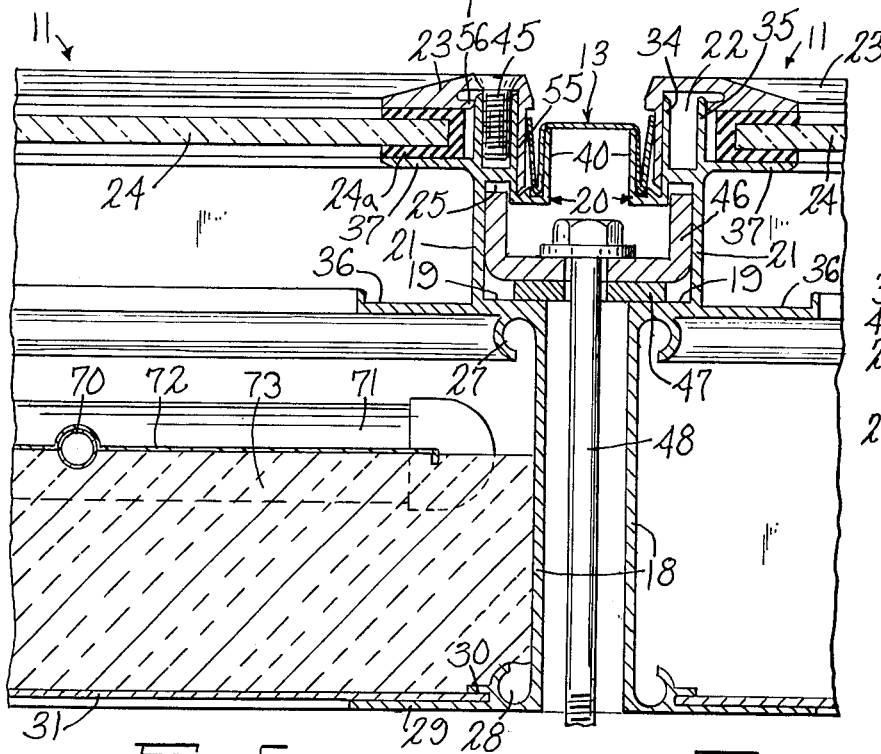
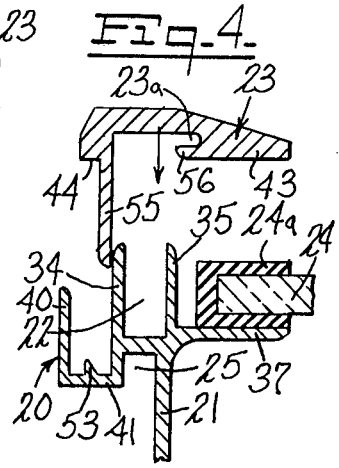
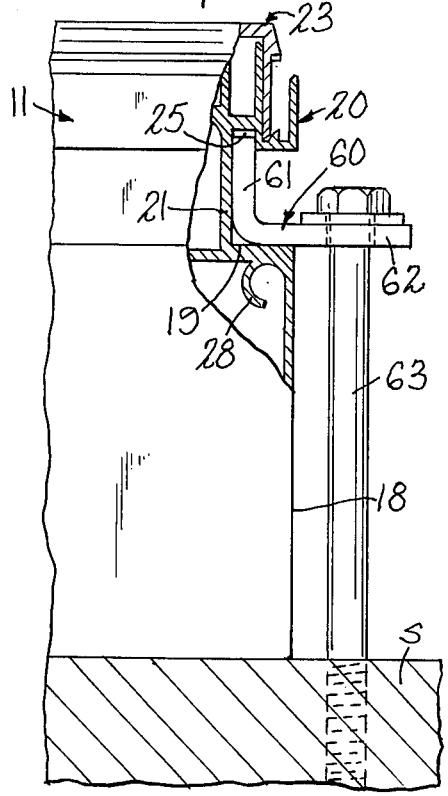
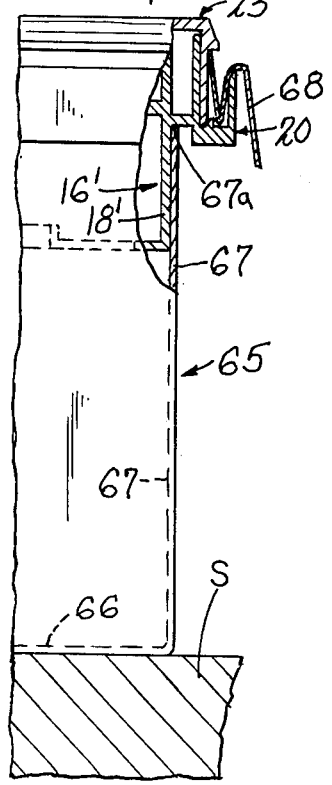

SOLAR ENERGY COLLECTOR

This invention relates generally to solar energy collectors and more particularly to housing members of solar energy collectors.

Solar energy collectors generally comprise a housing having a transparent cover overlaying and spaced apart from a solar energy absorber. The absorber absorbs radiant energy from the sun and the heat energy in the absorber is then transferred to another location by a heat transfer medium such as air passing over the absorber in surface contact therewith, or a liquid flowing through heat exchange conduits in intimate heat exchange relationship with the absorber.

In order to obtain maximum efficiency the collector housing should be essentially free of any ambient moisture or air. Additionally, the collector housing or housings comprising the modules of the system should be arranged to be easily flashed to a structure and to each other. The flashing helps keep snow from accumulating between the modules, insulates the sides and bottom of the modules from the weather, and improves the general appearance of the module array. To minimize expense, the collector should be designed for the maximum ease of assembly and arrangement in multiple and to minimize problems of installation of the housing in a system.

This invention provides a new and improved housing for a solar energy collector which is easily and quickly assembled and where the housings of individual collectors may be readily positioned and secured to a structure, and then flashed to the structure and to each other.

Briefly stated, the invention in one form thereof comprises a collector formed of a plurality of preformed sections which are mitered and joined together to form a rectangular housing. A cap member which clamps a transparent cover member to the housing also serves to retain flashing material to the housing in a flashing reglet formed integral with the housing walls. The reglet also serves as an integral handhold by which the collector may be lifted. Additionally, the housing walls are so formed that adjacent housings may be readily squared, secured to each other, and to a structure.

An object of this invention is to provide a new and improved housing for a solar energy collector.

Another object of this invention is to provide a solar energy collector housing capable of being easily and quickly assembled and installed, wherein individual housings are flashed together in a new and improved manner which reduces energy losses due to wind, rain and snow contacting the sides.

A further object of this invention is to provide a collector housing having easily producible wall portions and interlockable parts that are easily and quickly interconnected to form a complete collector system.

The features of the invention which are believed to be novel are particularly pointed out and distinctly claimed in the concluding portion of this specification. The invention, however, both as to its operation and organization together with further objects and advantages thereof may best be appreciated by reference to the following detailed description taken in conjunction with the drawings, wherein:

FIG. 1 is a plan view of an array of solar collectors;

FIG. 2 is an isometric view of a corner of a collector, partially cut away, as may be seen generally from the lower right hand corner of FIG. 1;

FIG. 3 is a sectional view seen in the plane of lines 3—3 of FIG. 1 showing two adjacent collectors and flashing therebetween, with the interior of one collector omitted for clarity;

FIG. 4 is an enlarged view of a portion of FIG. 3, showing a cap member being positioned;

FIG. 5 is an enlarged view, in part, of the flashing of FIG. 3;

FIG. 6 is a view of a portion of a collector housing, partially cut away, to show a securing feature thereof; and FIG. 7 is a view of an alternate collector structure, partially cut away, embodying the invention.

As used herein, the term "collector" refers to a complete solar energy collector including an absorber panel and heat exchange means. The term "collector housing" refers only to the housing for the absorber panel and heat exchange means.

As shown in FIG. 1, an assembly 10 of collectors 11 is arranged in coordinate array with continuous flashing strips 12 and 13 between adjacent edges. As shown, strip 12 continues to other collectors (not shown in the array). Strip 13 may also continue to other vertically arrayed collectors. As hereinafter more fully described, the collector housings, in one form, comprise extruded aluminum walls, cut, mitered and joined. One or more of such walls may have an outwardly extending top and/or bottom flange 14 by which the collectors may be secured to a structure as by bolts or screws 15.

As shown in FIGS. 2 and 3, the housings comprise wall sections 16 and 17, section 17 differing from section 16 only in the provision of the outwardly extending securing flanges 14. Each wall section includes a vertical wall 18 extending upwardly to a shoulder 19. Spaced above shoulder 19 is a flashing reglet 20, open from the top. An upper vertical wall 21 extends above shoulder 19 and carries a generally U-shaped channel 22. A cap 23 received over channel 22 holds down a transparent cover member 24 having a sealing member 24a about its edge. A downwardly opening U-shaped channel 25 is defined above shoulder 19.

The wall sections may be mounted together by means of a rigid angle member 26 (FIG. 2) fitted behind integral sockets 27 and 28 (FIG. 3). As shown in FIG. 3, lower socket 28 has a small lip or tang thereon cooperating with a foot member 29 to form a retaining pocket 30 for bottom wall member 31. The angle 26 may be fastened to sections 16 and 17 by screws 32. Alternately, the wall sections may be joined by self-tapping screws (not shown) received in sockets 27 and 28.

A rigid angle member 33 (FIG. 2) may be disposed in channel 22 at the corners of the housing. The walls 34 and 35 defining channel 22 may be crimped to angle member 33, or alternatively screws (not shown) may be passed through one of walls 34 and 35 into angle member 33. The angle member 33 need not be used in the structures shown in FIGS. 2 and 3, but is used in the structure shown in FIG. 7, hereinafter described.

A condensation trough or gutter 36 as disclosed in U.S. Pat. No. 3,980,071 extends inwardly of the wall sections. Extending inwardly from wall 21 is a support ledge 37 for transparent cover member 24. Flashing reglet 20 is defined by an upright wall 40 and bottom wall 41 (FIG. 4). The reglet 20 together with wall 21 define channel 25, overhanging shoulder 19.

Cap member 23, as shown more clearly in FIG. 4, is formed with an inwardly directed portion 43 to overlie and clamp down cover member 24 on support ledge 37, and also has an outwardly overhanging portion 44, which only partially overlies reglet 20. Cap member 23 is arranged to be fastened to section 16 by means of self-tapping screws 45 which are oversize with respect to channel 22.

As shown in FIG. 3, the overhanging reglet defining walls 40 and 41 provide a hand or finger hold for lifting and positioning the collector housing on a structure. Further, the horizontal shoulder 19 together with adjacent vertical walls 21 may be made parallel in array by means of a U-shaped member 46 having upstanding ends which are received in channels 25 of the walls of adjacent housing members. One or more members are initially inserted on shoulders 19 and properly space adjacent housings. Then a shim member 47 is slid under members 46 raising the ends thereof into channels 25. This locks adjacent housings together and in array. A single member 46 may be used to align and lock many pairs of housings. Alternately, a plurality of short length members 46 may be utilized. A bolt or screw 48 may be passed through member 46 and shim 47 to the mounting structure. This is optional.

Flashing 13 (FIG. 5) has downwardly depending turned-over ends defining a bottom edge 50 and a resilient leaf section 51 having an end 52. Ends 50 are received between wall 40 of reglet 20 and a projection 53 (FIG. 4) on the bottom wall 41 of the reglet. The ends 52 of leaf 51 position themselves under back extension 44 of cap 23 to prevent unintentional removal of flashing 13. Flashing 13 may be formed with an indented or folded mid-portion (not shown) to accommodate any expansion and contraction. Projection 53 also defines a seat for cap 23 when it is applied to the collector housing. A depending outer leg 55 of cap 23 is received between projection 53 and wall 34. Leg 55 facilitates alignment and joining cap 23 to the housing walls. The receipt of leg 55 between wall 35 and projection 53 rigidizes the cap on the housing. As cap member 23 is lowered into position, an interior projection 56 thereon will engage wall 35. Then, when screws 45 are applied, wall 35 is forced against projection 56. This cap 23 is tightly secured to the collector housing. Then upon installation of the collectors, the flashing is installed. The collectors may be spaced apart sufficient distances by members 45 to provide space for exterior manifolds connecting the individual collectors.

It is apparent that the collector may be formed of all four side wall members of the same section providing integral flashing reglets and alignment surfaces. Alternatively, one or more of the wall sections may have the outwardly extending flanges 14.

As exemplified in FIG. 6, the channels 25 also serve a single side alignment and securing function. One or more angles 60 are disposed with a vertical leg 61 extending into channel 25 and against wall 21, and the horizontal leg 62 resting on shoulder 19. Lag screws or bolts 63 extending through horizontal legs 62 are then utilized to secure the collector to the structure S. The securing means shown in FIG. 6 will generally be used on collectors as spacing and sound construction practices dictate. An angle may extend along two or more collectors.

FIG. 7 illustrates another embodiment of the invention where wall sections 16' are formed without shoulder 19. The portions of wall section 16' bear the same reference numerals as the same portions of wall sections 16. The wall sections 16' are mitered and assembled into rectangular form as by means of the angle members 33 (FIG. 2) placed in channels 22 at the corners and secured therein as previously described. This assembled housing is set upon a preformed rectangular pan 65, having a bottom wall 66, and end and side walls 67 with upper edges 67a which engage and support a housing of members 16' in channels 25 and telescope with respect to wall 18'.

FIG. 7 further shows a form of end flashing 68 secured in flashing reglet 20 as previously described, and extending outwardly toward the structure S. Such flashing 68 may be used at the edges of the collector array.

If it is desired to remove the flashing for maintenance on the collectors or any manifolds therebetween, this may be easily accomplished by merely inserting a screw driver or other flat bladed instrument into the reglet, bending back leaf 51, and removing the strip of flashing. At the points where flashing cross, the depending portions of one may be removed. For this crossover purpose, the reglets extend only to the mitered corners as shown in FIG. 2.

The collectors may be spaced apart any desired dimension, and the flashing chosen to accommodate such dimensioning. For example, the upper and lower collectors of FIG. 1 may be spaced apart a sufficient distance to permit manifolds connecting the heat exchange conduits of each collector to be placed therebetween.

The collector housing may be utilized for collectors of either the liquid or gas heat exchange type. The example shown in FIG. 3 is of the liquid heat exchange type having a plurality of conduits 70 (only one shown) and in intimate heat exchange relation with an absorber panel 72. The absorber assembly rests on a bed of insulation 73 within each housing.

The construction of cap 23 provides many advantages. The cap 23 with its depending leg 55 engaging wall 34 and projection 56 against wall 35 ensure a liquid and moisture-proof fit of the cap on the housing. The depending leg 55 with the bevel on the end thereof fitting against the bevel on projection 53 provides an alignment function and also prevents any distortion of the cap. The recess 23a at the upper interior of cap 23 aids in clamping of the walls 34 and 35 between leg 55 and projection 56. The overhang 44 provides a snap locking feature for the flashing. As the flashing is pushed down into the reglet 20, edge 52 of leaf 51 will snap into position against cap leg 55 under projection 44. The upper edges of walls 34 and 35 are rounded to facilitate easy assembly of cap 23, and projection 56 is rounded for the same purpose.

The upper channel 22 not only serves as a cap retaining screw slot, but also as a receptacle for the corner stiffening angles 33.

The unique flashing reglet permits a multitude of flashing arrangements. The flashing to the collector housings need not be watertight. The flashing is basically for general weather protection, and for visual appearance. It prevents any lodging of snow or water between vertically adjacent collectors. The flashing adjacent the upper edges of the collector housing and the reglets provide passages for removal of moisture due to rain or snow, and further permits the collectors to be mounted directly to the roof sheathing of a structure. Since the collectors are sealed, prefabricated structures, they may be placed directly on the sheathing of a structure. Then the flashing may be installed without removal of the caps. Moreover, vapor from the structure may escape from the sheathing to the spaces between the collectors under the flashing and be exhausted to the atmosphere through vents in the flashing at the bottom of the array. The collectors are generally mounted on spacers on the structure to permit air circulation thereunder.

It may be thus seen that the objects of the invention set forth as well as those made apparent from the foregoing description are efficiently attained. While preferred embodiments of the invention have been set forth for purposes of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A housing for a solar energy collector comprising wall members defining side and end walls and a bottom wall, said wall members having an indentation along the sides thereof defining a lower shoulder and an upper surface above said shoulder, a flashing reglet extending upwardly from said upper surface, and a cap member adapted to be fitted to said housing over said wall members and retain a cover on said housing, said reglet extending along said wall members and having an upper opening outwardly from said cap.

2. The housing of claim 1 wherein a downwardly opening channel is defined in said upper surface above said shoulder.

3. The housing of claim 2 in combination with an angle member, said angle member having a first leg extending into said channel and a second leg resting on said shoulder and fastening means extending through said second leg.

4. A pair of housings as defined in claim 2, in side-by-side relation on a structure, a U-shaped member having upstanding parallel side walls and a bottom wall, said upstanding walls received in said channels, said bottom wall supported on the shoulders of said housings, whereby said housings are aligned and connected by said U-shaped member.

5. The combination of claim 4 wherein a plurality of said channel members are provided between said housings.

6. The combination of claim 4 further including fastening means extending through the bottom wall of said U-shaped member.

7. The housing of claim 1 wherein said upper edge of said side and end walls are defined by spaced apart inner and outer walls defining an upwardly opening channel, said cap member includes an outer leg engaging said outer wall and a projection engaging said inner wall, said cap further including an outwardly projecting portion only partially overlying said reglets.

8. A pair of housings as defined in claim 1, in side-by-side relation on a structure, a flashing member having depending edges, said edges received in adjacent reglets.

9. A pair of housings as defined in claim 7 in side-by-side relation, further including a flashing member having upturned resilient edges, said upturned resilient edges residing under the outwardly projecting portion of said cap members.

10. A housing for a solar energy collector comprising a frame member having spaced apart walls at the upper edges thereof defining a channel, means within said housing below said upper edges for supporting a transparent cover thereon, a cap member for retaining a cover on said housing having an upper internal recess defined by a depending leg and a projection, said cap fitting over said spaced apart walls with the leg engaging the outer of said walls and said projection engaging the inner of said walls, said cap having an inwardly extending portion retaining said transparent cover member on said supporting means, said cap being secured to said housing by fastening screws extending into said channel and the walls defining said channel whereby one of said walls are forced against said cap projection and said depending leg.

11. The housing of claim 10 further including a flashing reglet extending along the walls of said housing and defining an upwardly opening channel, said cap having a rearwardly projecting portion partially overlying said reglet whereby flashing may be inserted in said reglet while the cap is on said housing and said rearwardly projecting portion retains said flashing in said reglet.

12. A housing for a solar energy collector comprising a bottomless rectangular frame member having spaced apart walls at the upper edges thereof defining a rectangular channel, angle members received in said channel at the corners thereof and secured therein, a transparent cover member supported in said frame member, a rectangular cap member having spaced apart points received on either side of said spaced apart walls, said cap member having an inwardly directed projection engaging and retaining said cover member, a downwardly opening second channel defined in said frame member beneath said channel and a bottom rectangular pan member having upper edges received in said second channel.

13. The housing of claim 12 wherein continuous flashing reglets are defined on the outside of said frame member along the walls thereof.

14. A housing for a solar energy collector, comprising a bottomless rectangular frame, said frame having side and end walls, said walls including a depending wall portion and an outwardly extending wall portion, an internal ledge extending from said walls to support a transparent cover thereon, a rectangular pan having side and end walls with upper edges engaging said outwardly extending wall portions and supporting said frame thereon with said depending wall portion extending into said pan in telescoping contact with said pan walls.

15. The housing of claim 14 wherein a downwardly opening channel is defined in said outwardly extending wall portion and receives the upper edges of said pan therein.

16. The housing of claim 15 wherein a continuous flashing reglet extends upwardly from said outwardly extending portion of said wall members.

17. A housing for a solar energy collector comprising wall members defining side and end walls and a bottom wall, said wall members having an indentation along the sides thereof defining a lower shoulder and an upper surface above said shoulder, a flashing reglet extending upwardly from said walls and having an upper opening and a cap member adapted to be fitted to said housing over said wall members and retain a cover on said housing, said cap member having a projection extending outwardly from said wall members and at least partially overlying the opening of said reglet.

18. The housing of claim 17 wherein a downwardly opening channel is defined in said upper surface above said shoulder.

19. A pair of housings as defined in claim 18, in side-by-side relation on a structure, a U-shaped member having upstanding parallel side walls and a bottom wall, said upstanding walls received in said channels, said bottom wall supported on the shoulders of said housings, whereby said housings are aligned and connected by said U-shaped member.

20. The combination of claim 19 wherein a plurality of said channel members are provided between said housings.

21. The combination of claim 19 further including fastening means extending through the bottom wall of said U-shaped member.

22. The housing of claim 17 wherein said upper edge of said side and end walls are defined by spaced apart inner and outer walls defining an upwardly opening channel, said cap member includes an outer leg engaging said outer wall and a projection engaging said inner wall, said cap further including an outwardly projecting portion only partially overlying said reglets.

23. A pair of housings as defined in claim 17 in side-by-side relation on a structure, a flashing member having depending edges, said edges received in adjacent reglets.

24. A pair of housings as defined in claim 23 in side-by-side relation, further including a flashing member having upturned resilient edges, said upturned resilient edges residing under said outwardly extending projections of said cap members.

25. A housing for a solar energy collector comprising wall members defining side and end walls, a transparent cover member supported on said walls, means defining an upwardly generally U-shaped flashing reglet extending outwardly from said walls, and means on said walls at least partially overlying the upward opening of said reglet and retaining said cover member on said walls.

* * * * *